(12) United States Patent
Sun et al.

(10) Patent No.: US 11,301,039 B2
(45) Date of Patent: Apr. 12, 2022

(54) METHOD AND DEVICE FOR CALCULATING PARAMETERS OF GAZE-POINT CALCULATION MODEL

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jiankang Sun, Beijing (CN); Hao Zhang, Beijing (CN); Lili Chen, Beijing (CN); Liyang Cui, Beijing (CN); Yachong Xue, Beijing (CN); Gang Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 14 days.

(21) Appl. No.: 16/836,054

(22) Filed: Mar. 31, 2020

(65) Prior Publication Data
US 2021/0089123 A1 Mar. 25, 2021

(30) Foreign Application Priority Data
Sep. 23, 2019 (CN) .......................... 201910900395.3

(51) Int. Cl.
*G06F 3/01* (2006.01)
(52) U.S. Cl.
CPC ................... *G06F 3/013* (2013.01)

(58) Field of Classification Search
CPC .................................. G06F 3/13; G06F 3/013
See application file for complete search history.

(56) References Cited

U.S. PATENT DOCUMENTS

| | | | |
|---|---|---|---|
| 2010/0245767 A1 | 9/2010 | Chao | |
| 2019/0250705 A1* | 8/2019 | Zhang | ..................... G06F 3/011 |
| 2021/0341998 A1 | 11/2021 | Sun | |

FOREIGN PATENT DOCUMENTS

| | | |
|---|---|---|
| CN | 102830793 A | 12/2012 |
| CN | 104898823 A | 9/2015 |

(Continued)

OTHER PUBLICATIONS

Chinese Office Action in Chinese Application No. 201910900395.3 dated Sep. 29, 2021 with English translation.

*Primary Examiner* — Kent W Chang
*Assistant Examiner* — Chayce R Bibbee
(74) *Attorney, Agent, or Firm* — Collard & Roe, P.C.

(57) ABSTRACT

The application discloses a method and a device for calculating parameters of a gaze-point calculation model. The method includes: displaying multiple calibration points in sequence on a device screen, and collecting multiple pupil-coordinates data corresponding to each of at least one calibration point of the multiple calibration points; for each calibration point of the at least one calibration point, screening the multiple pupil-coordinates data corresponding to the calibration point, to obtain at least one pupil-coordinates calibration data corresponding to the calibration point; calculating multiple parameters of the gaze-point calculation model according to coordinates data of each calibration point and the at least one pupil-coordinates calibration data corresponding to the calibration point.

17 Claims, 3 Drawing Sheets

(56) References Cited

FOREIGN PATENT DOCUMENTS

| CN | 106445167 A | 2/2017 |
| CN | 109766012 A | 5/2019 |
| CN | 110032271 A | 7/2019 |

* cited by examiner

METHOD AND DEVICE FOR CALCULATING PARAMETERS OF GAZE-POINT CALCULATION MODEL

The present application claims priority to Chinese Patent Application No. 201910900395.3, filed on Sep. 23, 2019, the disclosure of which is incorporated herein by reference in its entirety as part of the present application.

TECHNICAL FIELD

The present application relates to the field of eyeball tracking technology, and more particularly, relates to a method and device for calculating parameters of a gaze-point calculation model.

BACKGROUND

As the evolution of science and technology, the continuous development of Virtual Reality (VR) technology and Augmented Reality (AR) technology, eyeball tracking technology has been developed rapidly. Among them, the eyeball tracking technology is a technology to calculate the line of sight according to the changes of the eye (pupil and pupil periphery) features of a user. Because different users have different eye features, when a user uses a VR device or an AR device, the eyeball tracking system in the VR device or the AR device needs to calculate parameters in a gaze-point calculation model according to the eye features of the user, so as to obtain a user-specific gaze-point calculation model. Then the calculation of the line-of-sight is performed based on the user-specific gaze-point calculation model, the position coordinates of the user's gaze-point on a device screen can be accurately calculated.

SUMMARY

In view of this, the embodiments of the present application provide a method and device for calculating parameters of a gaze-point calculation model, the main purpose of which is aiming at calculating parameters of the gaze-point calculation model accurately.

In order to solve the above problems, the present application mainly provides the following technical schemes.

In an aspect, a method for calculating parameters of a gaze-point calculation model is provided by the present application. The method comprises: displaying multiple calibration points in sequence on a device screen, and collecting multiple pupil-coordinates data corresponding to each of at least one calibration point of the multiple calibration points; for each calibration point of the at least one calibration point, screening the multiple pupil-coordinates data corresponding to the calibration point, to obtain at least one pupil-coordinates calibration data corresponding to the calibration point; calculating multiple parameters of the gaze-point calculation model, according to coordinates data of each calibration point and the at least one pupil-coordinates calibration data corresponding to the calibration point.

In the embodiments of the present application, said screening the multiple pupil-coordinates data corresponding to the calibration point further comprises: dividing the multiple pupil-coordinates data corresponding to the calibration point into multiple pupil-coordinates data groups; for each of the multiple pupil-coordinates data groups, calculating a standard deviation value corresponding to the pupil-coordinates data group; determining a pupil-coordinates data group with the smallest standard deviation value as a pupil-coordinates calibration data group corresponding to the calibration point; deleting abnormal pupil-coordinates data in the pupil-coordinates calibration data group, and determining at least one pupil-coordinates data included in the pupil-coordinates calibration data group after deletion as the pupil-coordinates calibration data corresponding to the calibration point.

In the embodiments of the present application, said calculating the standard deviation value corresponding to the pupil-coordinates data group comprises: extracting an abscissa and an ordinate corresponding to each pupil-coordinates data of the pupil-coordinates data group; calculating a first standard deviation value corresponding to multiple abscissas of the pupil-coordinates data group, and calculating a second standard deviation value corresponding to multiple ordinates of the pupil-coordinates data group; calculating an average value of the first standard deviation value and the second standard deviation value, and determining the average value as the standard deviation value corresponding to the pupil-coordinates data group.

In the embodiments of the present application, said deleting abnormal pupil-coordinates data in the pupil-coordinates calibration data group further comprises: deleting highly-abnormal pupil-coordinates data in the pupil-coordinates calibration data group, and deleting lowly-abnormal pupil-coordinates data in the pupil-coordinates calibration data group.

In the embodiments of the present application, said deleting highly-abnormal pupil-coordinates data in the pupil-coordinates calibration data group further comprises: extracting an abscissa and an ordinate corresponding to each pupil-coordinates data in the pupil-coordinates calibration data group; calculating a coordinates average value corresponding to the pupil-coordinates calibration data group, according to the abscissa and the ordinate corresponding to each pupil-coordinates data; setting a pupil-coordinates range, according to the coordinates average value and the standard deviation value corresponding to the pupil-coordinates calibration data group; and deleting pupil-coordinates data that does not satisfy the pupil-coordinates range, as the highly-abnormal pupil-coordinates data.

In the embodiments of the present application, said deleting lowly-abnormal pupil-coordinates data in the pupil-coordinates calibration data group further comprises: calculating an average-coordinates point corresponding to the pupil-coordinates calibration data group, according to the abscissa and the ordinate corresponding to each pupil-coordinates data in the pupil-coordinates calibration data group after the highly-abnormal pupil-coordinates data is deleted; calculating distance values from each pupil-coordinates data to the average-coordinates point; sorting multiple distance values in descending order; and deleting a predetermined count of pupil-coordinates data corresponding to the top-ranked distance values in the pupil-coordinates calibration data group.

In the embodiments of the present application, said calculating multiple parameters of the gaze-point calculation model according to coordinates data of each calibration point and the at least one pupil-coordinates calibration data corresponding to the calibration point comprises: for each of the at least one calibration point, calculating pupil-coordinates calibration average data corresponding to the calibration point, according to at least one pupil-coordinates calibration data corresponding to the calibration point; substituting the coordinates data of each calibration point and the pupil-coordinates calibration average data corresponding to the calibration point into the gaze-point calculation model to obtain multiple polynomials; and solving the multiple polynomials by a least square method to calculate the multiple parameters of the gaze-point calculation model.

In the embodiments of the present application, the displaying multiple calibration points in sequence on the device screen comprises: sequentially displaying multiple calibration points on the device screen according to preset positions.

In the embodiments of the present application, the preset positions are arranged in a matrix or a ring.

According to another aspect of the present application, an electronic device is provided. The electronic device includes a memory, a processor, and a program stored on the memory and executable on the processor. When the processor executes the program, the method for calculating parameters of a gaze-point calculation model described above is implemented.

According to another aspect of the present application, a non-volatile computer-readable storage medium is provided, on which a computer program is stored, and when the program is executed, the method for calculating parameters of a gaze-point calculation model described above is implemented.

In another aspect, the present application also provides a device for calculating parameters in a gaze-point calculation model. The device comprises: a display screen, a collecting apparatus, and a processor. The display device is configured to sequentially display multiple calibration points; the collecting apparatus is configured to collect multiple pupil-coordinates data corresponding to each of at least one calibration point of the multiple calibration points; the processor is configured for: for each calibration point of the at least one calibration point: screening the multiple pupil-coordinates data corresponding to the calibration point, to obtain at least one pupil-coordinates calibration data corresponding to the calibration point; calculating multiple parameters of the gaze-point calculation model, according to coordinates data of each calibration point and the at least one pupil-coordinates calibration data corresponding to the calibration point.

According to another aspect of the present application, a method for calculating gaze-points is provided. The method comprises: collecting multiple pupil-coordinates data, calculating a gaze-point on a device screen, according to a gaze-point calculation model and the multiple pupil-coordinates data; wherein parameters of the gaze-point calculation model are calculated by the following steps: displaying multiple calibration points in sequence on the device screen and collecting multiple pupil-coordinates data corresponding to each of at least one calibration point of the multiple calibration points; for each calibration point of the at least one calibration point, screening the multiple pupil-coordinates data corresponding to the calibration point, to obtain at least one pupil-coordinates calibration data corresponding to the calibration point; calculating multiple parameters of the gaze-point calculation model, according to coordinates data of each calibration point and the at least one pupil-coordinates calibration data corresponding to the calibration point.

The above description is only an overview of the technical schemes of the present application. In order to understand the technical schemes of the present application more clearly, the technical schemes of the present application can be implemented according to the content of the description. In order to make the above and other objects, features, and advantages of the present application more comprehensible, specific embodiments of the present application are enumerated as follows.

BRIEF DESCRIPTION OF THE DRAWINGS

In order to more clearly explain the technical schemes of the embodiments of the present application, the drawings of the embodiments will be briefly introduced. It should be understood that the drawings in the following description refer to only some of the embodiments of the present application, and are not intended to limit the scope of the embodiments of the present application.

DETAILED DESCRIPTION

In order to make the purposes, technical schemes and advantages of the embodiments of the present application clearer, the technical scheme of the embodiments of the present application will be clearly and completely described as follows, with reference to the drawings of the embodiments of the present application. Obviously, the described embodiments are part of the embodiments of the present application, not all of the embodiments. Based on the described embodiments of the present application, other embodiments obtained by those skilled in the art without inventive labor are all within the scope of protection of the present application.

At present, when parameters in a gaze-point calculation model are calibrated by an eyeball tracking system based on the eye features of a user, firstly, multiple calibration points need to be displayed in sequence in the device screen. When the user looks at each calibration point, eye images of the user corresponding to each calibration point are captured. Then the position coordinates of the pupil (i.e. pupil-coordinates data) in each eye image of the user are calculated by an image algorithm. Finally, the coordinates data corresponding to each calibration point and the pupil-coordinates data corresponding to the calibration point are substituted into the gaze-point calculation model, and parameters of the gaze-point calculation model are solved, so that multiple parameters of the gaze-point calculation model can be calibrated. However, in the calibration process, the parameters obtained by the calibration process may be inaccurate, if the user blinks when an eye image of the user is captured or an error occurs when the pupil-coordinates data is calculated. Thus, the position coordinates of the user's gaze-point in the device screen cannot be accurately calculated by a user-specific gaze-point calculation model.

Figure 1:
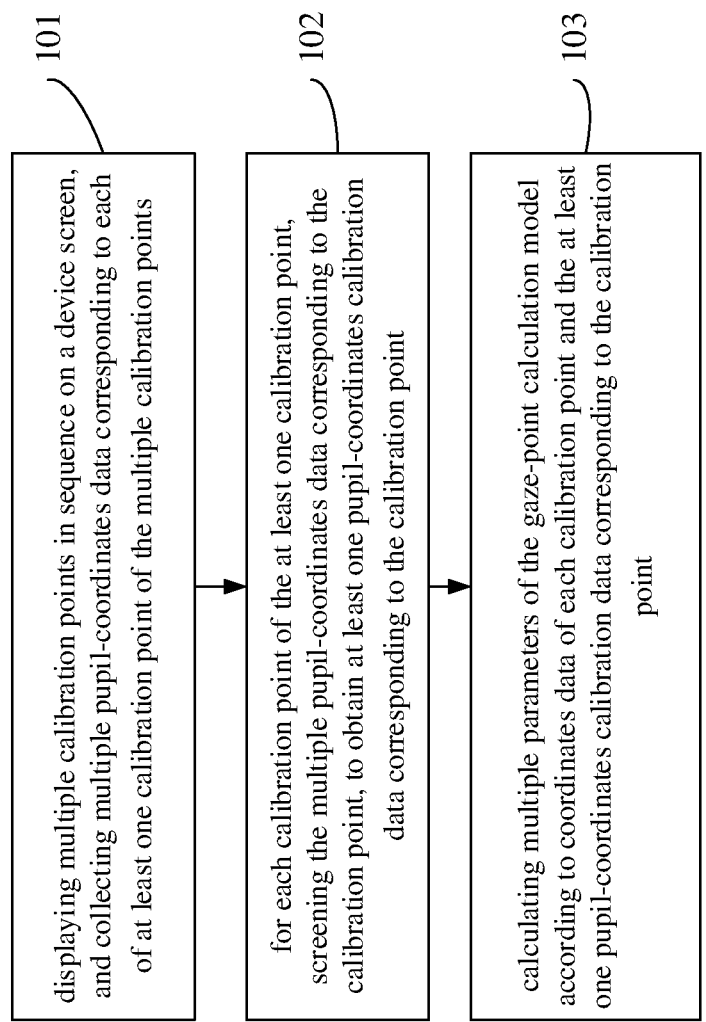
FIG. 1 is a flowchart of a method for calibrating parameters of a gaze-point calculation model provided by the embodiments of the present application.

To this end, the embodiments of the present application provide a method for calibrating parameters of a gaze-point calculation model, as shown in FIG. 1, the method includes step 101, step 102 and step 103.

At step 101: multiple calibration points are displayed on a device screen in sequence, and multiple pupil-coordinates data corresponding to at least one calibration point of the multiple calibration points are collected. For example, multiple pupil-coordinates data corresponding to each calibration point can be obtained.

The count of multiple calibration points may be 5, 7, 9, etc., on which no limitation is specifically made in the embodiments of the present application.

In the embodiments of the present application, the executing entity in each step is an eyeball tracking system implemented in a VR device or an AR device. When a user wears the VR device or the AR device, multiple calibration points are displayed in the device screen by the eyeball tracking system in the VR device or the AR device sequentially. At this time, the user sequentially looks at each calibration point displayed on the device screen. In the process that the user looks at each calibration point displayed in the device screen, multiple pupil-coordinates data corresponding to each calibration point are collected by the eyeball tracking system. For example, when the user looks at the calibration point currently displayed in the device screen, multiple user eye images in the process that the user looks at the calibration point are captured by an infrared camera in the eyeball tracking system. The position coordinates of a pupil in each user eye image are calculated by a preset image algorithm, so as to obtain multiple pupil-coordinates data corresponding to the calibration point. According to the method, multiple pupil-coordinates data corresponding to each calibration point can be obtained.

Specifically, in this step, the position coordinates of each calibration point in the device screen (i.e., the preset position corresponding to each calibration point) are preset by the eyeball tracking system. When the user wears the VR device or the AR device, multiple calibration points are sequentially displayed in the device screen according to the preset position corresponding to each calibration point, by the eyeball tracking system. Alternatively, the position coordinates of each calibration point in the device screen may be not preset by the eyeball tracking system. When a user wears the VR device or the AR device, multiple position coordinates in the device screen are randomly selected by the eyeball tracking system according to the count of multiple calibration points, and the multiple calibration points are sequentially displayed in the device screen according to the multiple randomly selected position coordinates, but is not limited thereto.

It needs to be explained that, in the actual application process, any count of pupil-coordinates data corresponding to each calibration point can be collected by the eyeball tracking system. For example, the calibration point currently displayed on the screen of the device is calibration point 1. In the process that the user looks at calibration point 1, if 60 eye images of the user are captured through the infrared camera in the eyeball tracking system, 60 pupil-coordinates data corresponding to calibration point 1 can be collected by the eyeball tracking system; if 90 eye images of the user are captured through the infrared camera in the eyeball tracking system, 90 pupil-coordinates data corresponding to calibration point 1 can be collected by the eyeball tracking system. No limitation is specifically made on the count of pupil-coordinate data corresponding to each calibration point in the embodiments of the present application.

At step 102: For each calibration point in the at least one calibration point, the multiple pupil-coordinates data corresponding to the calibration point are screened, so as to obtain at least one pupil-coordinates calibration data corresponding to the calibration point. For example, some of the multiple pupil-coordinates data corresponding to each calibration point can be deleted to obtain at least one pupil-coordinates calibration data corresponding to each calibration point.

In the embodiments of the present application, in order to avoid inaccurate calibration of multiple parameters due to user's blinking in the process of capturing user's eye images and errors in the process of calculating pupil-coordinates data, deletion is required to be performed on some of the multiple pupil-coordinates data corresponding to each calibration point after the multiple pupil-coordinates data corresponding to each calibration point is obtained by the eyeball tracking system. That is, abnormal pupil-coordinates data among the multiple pupil-coordinates data corresponding to each calibration point is deleted, thereby obtaining at least one pupil-coordinates calibration data corresponding to each calibration point. Subsequently, the multiple parameters of the preset gaze-point calculation model are accurately calibrated based on at least one pupil-coordinates calibration data corresponding to each calibration point.

At step 103: parameters of the gaze-point calculation model are calculated according to coordinates data of each calibration point and the at least one pupil-coordinates calibration data corresponding to the calibration point. For example, multiple parameters of the preset gaze-point calculation model are calibrated according to coordinates data corresponding to each calibration point and the at least one pupil-coordinates calibration data corresponding to the calibration point. Therein, the coordinate data corresponding to each calibration point is the position coordinates of the calibration point in the device screen.

In the embodiments of the present application, after the at least one pupil-coordinates calibration data corresponding to each calibration point is obtained by the eyeball tracking system, multiple parameters of the preset gaze-point calculation model can be calibrated according to the coordinates data corresponding to each calibration point and the at least one pupil-coordinates calibration data corresponding to the calibration point, thus a user-specific gaze-point calculation model can be obtained. In the subsequent process of a user using the VR device or the AR device, the eyeball tracking system can calculate the position coordinates of the user's gaze-point in the device screen accurately by inputting the user's pupil-coordinates data into the user-specific gaze-point calculation model.

Specifically, in this step, firstly, pupil-coordinates calibration average data corresponding to each calibration point is calculated by the eyeball tracking system according to at least one pupil-coordinates calibration data corresponding to the calibration point. Then, the coordinates data corresponding to each calibration point and the pupil-coordinates calibration average data corresponding to the calibration point are sequentially substituted into the preset gaze-point calculation model to obtain multiple polynomials. Finally, multiple parameters of the preset gaze-point calculation model are calibrated by solving the multiple polynomials, but without limitation.

The embodiments of the present application provide a method for calibrating parameters of a gaze-point calculation model. Compared with the prior art, in which an eyeball tracking system just collects one pupil-coordinates data corresponding to each calibration point when calibrating multiple parameters in a gaze-point calculation model, in the embodiments of the present application, multiple calibration points can be sequentially displayed in a device screen by an eyeball tracking system in a VR device or an AR device after a user wears the VR device or the AR device, in the process that the user looks at each calibration point displayed on the device screen, multiple pupil-coordinates data corresponding to each calibration point are collected by the eyeball tracking system, and deletion is performed on some of the multiple pupil-coordinates data corresponding to each calibration point, thus at least one pupil-coordinates calibration data corresponding to each calibration point is obtained; finally, multiple parameters of the preset gaze-point calculation model are calibrated according to the coordinates data corresponding to each calibration point and at least one pupil-coordinates calibration data corresponding to the calibration point. Since multiple pupil-coordinates data corresponding to each calibration point are collected by the eyeball tracking system during the process of a user looking at each calibration point, and abnormal pupil-coordinates data are deleted among the multiple pupil-coordinates data corresponding to each calibration point to obtain pupil-coordinates calibration data corresponding to the calibration point, multiple parameters of the preset gaze-point calculation model can be accurately calibrated by the eyeball tracking system based on the pupil-coordinates calibration data corresponding to each calibration point. Therefore, it can be effectively avoided that multiple parameters obtained by calibration are inaccurate due to user's blinking in the process of photographing user eye images and errors in the process of pupil-coordinates data calculation.

Figure 2:
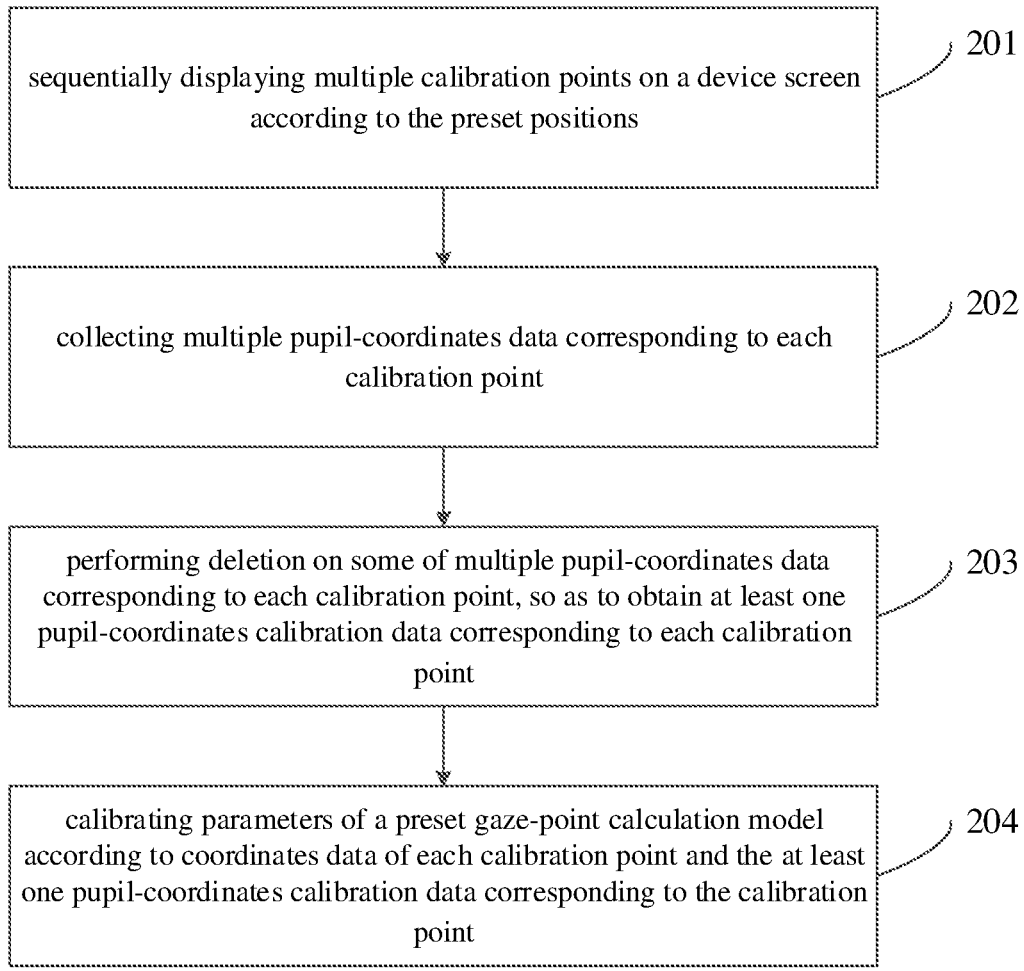
FIG. 2 is a flowchart of another method for calibrating parameters of a gaze-point calculation model according to the embodiments of the present application.

In order to explain in more detail below, the embodiments of the present application provide another method for calculating parameters of a gaze-point calculation model, specifically as shown in FIG. 2. The method includes step 201 to step 204.

At step 201: multiple calibration points are sequentially displayed on a device screen according to the preset positions.

In the embodiments of the present application, the count of multiple calibration points and the position coordinates of each calibration point in the device screen (i.e., the preset position corresponding to each calibration point) can be preset by the eyeball tracking system. Multiple calibration points in the device screen are sequentially displayed according to the preset position of each calibration point when a user wears a VR device or an AR device.

Figure 3A:
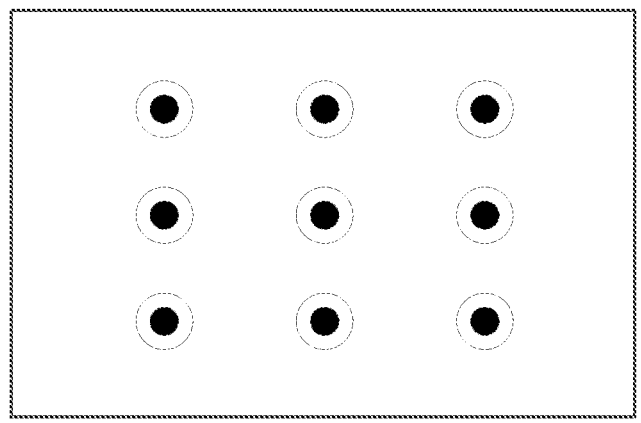
FIG. 3a shows a schematic diagram of setting preset positions of multiple calibration points according to the embodiments of the present application.
Figure 3B:
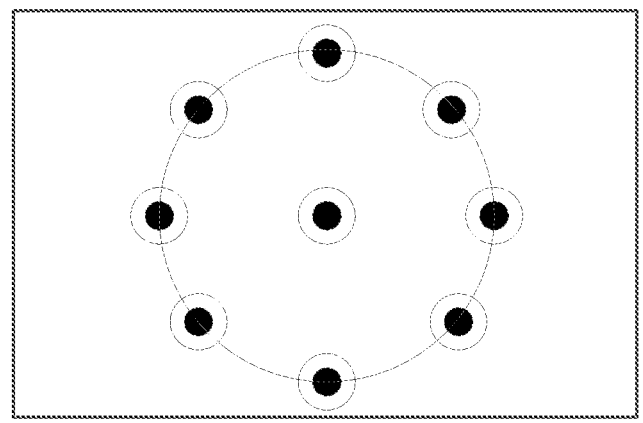
FIG. 3b shows another schematic diagram of setting preset positions of multiple calibration points according to the embodiments of the present application.

Specifically, in this step, taking the count of multiple calibration points being set as 9 as an example, as shown in FIG. 3a, the 9 calibration points can be divided into 3 rows by the eyeball tracking system, each row contains 3 calibration points, and the position coordinates of each calibration point are set in the device screen (i.e., the preset position corresponding to each calibration point). The method shown in FIG. 3b can also be used: one calibration point is taken as the center of the circle, and the other eight calibration points are set to form a circle, and the position coordinates of each calibration point in the device screen (i.e., the preset position corresponding to each calibration point) can be set, which is not limited by the embodiments of the present application.

At step 202: multiple pupil-coordinates data corresponding to each calibration point are collected.

For example, the operation of collecting multiple pupil-coordinates data corresponding to each calibration point in step 202 can correspond to the description of the related part of FIG. 1, which are not repeatedly described here by the embodiments of the present application.

At step 203: deletion is performed on some of the multiple pupil-coordinates data corresponding to each calibration point, so as to obtain at least one pupil-coordinates calibration data corresponding to each calibration point.

In the embodiments of the present application, in order to avoid inaccurate calibration of multiple parameters due to user's blinking in the process of capturing user eye images and errors in the process of calculating pupil-coordinates data, deletion is needed to be performed on some of the multiple pupil-coordinates data corresponding to each calibration point by the eyeball tracking system after the multiple pupil-coordinates data corresponding to each calibration point are obtained. Thus, at least one pupil-coordinates calibration data corresponding to each calibration point can be obtained. A detailed description will be given below on how the deletion is performed on some of the multiple pupil-coordinates data corresponding to each calibration point by the eyeball tracking system to obtain at least one pupil-coordinates calibration data corresponding to each calibration point.

At step (203.1): the multiple pupil-coordinates data corresponding to the calibration point are divided and grouped, so as to obtain multiple pupil-coordinates data groups.

In the embodiments of the present application, when the deletion is performed on some of the multiple pupil-coordinates data corresponding to each calibration point by the eyeball tracking system, firstly, one calibration point needs to be selected from the multiple calibration points. Then the multiple pupil-coordinates data corresponding to the selected calibration point are divided and grouped, so as to obtain multiple pupil-coordinates data groups corresponding to the selected calibration point.

It should be noted that no specific limitation is made by the embodiments of the present application on how to divide the multiple pupil-coordinates data corresponding to the selected calibration point into groups. For example, when the count of pupil coordinates corresponding to the selected calibration point is 60, 60 pupil-coordinates data can be divided into 2 pupil-coordinates data groups, and each pupil-coordinates data group includes 30 pupil-coordinates data; the 60 pupil-coordinates data can also be divided into 3 pupil-coordinates data groups, and each pupil-coordinates data group includes 20 pupil-coordinates data; the 60 pupil-coordinates data can also be divided into 4 pupil-coordinates data groups, and each pupil-coordinates data group includes 15 pupil-coordinates data; and so on.

At step (203.2): a standard deviation value corresponding to at least one pupil-coordinates data group is calculated, and a pupil-coordinates data group with the smallest standard deviation value is determined as a pupil-coordinates calibration data group corresponding to the calibration point.

In the embodiments of the present application, after multiple pupil-coordinates data groups corresponding to the selected calibration point are obtained by the eyeball tracking system, a standard deviation value corresponding to each pupil-coordinates data group needs to be calculated, and a pupil-coordinates data group with the smallest standard deviation value is determined as a pupil-coordinates calibration data group corresponding to the calibration point.

Therein, the specific process for the eyeball tracking system to calculate the standard deviation value corresponding to each pupil-coordinates data group is as follows. (1) A pupil-coordinates data group is selected among the multiple pupil-coordinates data groups, and an abscissa and an ordinate corresponding to each pupil-coordinates data of the pupil-coordinates data group are extracted, so as to obtain multiple abscissas and multiple ordinates. (2) A standard deviation value corresponding to the multiple abscissas (i.e., a first standard deviation value) is calculated, and a standard deviation value corresponding to the multiple ordinates (i.e. a second standard deviation value) is calculated. (3) An average value of the first standard deviation value and the second standard deviation value is calculated, and the calculated average value is determined as the standard deviation value corresponding to the selected pupil-coordinates data group. (4) According to the above method, the standard deviation value corresponding to each remaining pupil-coordinates data group is calculated sequentially.

At step (203.3): Abnormal pupil-coordinates data in the pupil-coordinates calibration data group is deleted, and at least one pupil-coordinates data included in the pupil-coordinates calibration data group after the deletion (i.e. the pupil-coordinates calibration data group obtained after abnormal pupil-coordinates data is deleted) is determined as the pupil-coordinates calibration data corresponding to the calibration point.

In the embodiments of the present application, after the pupil-coordinates calibration data group corresponding to the selected calibration point is determined by the eyeball tracking system, highly-abnormal pupil-coordinates data and lowly-abnormal pupil-coordinates data of the pupil-coordinates calibration data group are deleted. After the deletion is completed, at least one pupil-coordinates data included in the pupil-coordinates calibration data group can be determined as the pupil-coordinates calibration data corresponding to the selected calibration point.

For example, the specific process of the eyeball tracking system deleting the highly-abnormal pupil-coordinates data and the lowly-abnormal pupil-coordinates data of the pupil-coordinates calibration data group is as follows.

At step (203.3.1): a first deletion operation is performed on the pupil-coordinates calibration data group, so as to delete the highly-abnormal pupil-coordinates data in the pupil-coordinates calibration data group. The first deletion operation specifically comprises the following steps. Firstly, an abscissa and an ordinate corresponding to each pupil-coordinates data in the pupil-coordinates calibration data group are extracted, and a coordinates average value corresponding to each pupil-coordinates data is calculated according to the abscissa and the ordinate corresponding to the pupil-coordinates data. For example, the abscissa corresponding to a pupil-coordinates data A (x_1, y_1) is x_1 and the ordinate corresponding thereto is y_1, then the coordinates average value corresponding to the pupil-coordinates data A is (x_1+y_1)/2; the abscissa corresponding to a pupil-coordinates data B (x_2, y_2) is x_2 and the ordinate corresponding thereto is y_2, then the coordinates average value corresponding to the pupil-coordinates data B is (x_2+y_2)/2, etc. Then, an average value μ and a standard deviation value a corresponding to the multiple coordinates average values are calculated. Finally, a pupil-coordinates range is set according to the average p and the standard deviation value σ, and a pupil-coordinates data whose coordinates average value exceeds the pupil-coordinates range is deleted from the pupil-coordinates calibration data group. Specifically, in this step, the pupil-coordinates range can be set to (μ−3 σ, μ+3 σ), or the pupil-coordinates range can be set to (μ−2 σ, μ+2 σ), etc., on which no specific limitation is made in the embodiments of the present application.

At step (203.3.2): a second deletion operation is performed on the pupil-coordinates calibration data group, so as to delete the lowly-abnormal pupil-coordinates data in the pupil-coordinates calibration data group. The second deletion operation specifically comprises the following steps. Firstly, an average-coordinates point corresponding to the pupil-coordinates calibration data group is calculated according to the abscissa and the ordinate corresponding to each pupil-coordinates data in the pupil-coordinates calibration data group after the highly-abnormal pupil-coordinates data is deleted. Then, the distance values from each pupil-coordinates data to the average-coordinates data are calculated. For example, in the pupil-coordinates calibration data group after the highly-abnormal pupil-coordinates data is deleted, the remaining multiple pupil-coordinates data are the pupil-coordinates data A $(x_1, y_1)$, the pupil-coordinates data B $(x_2, y_3)$, and the pupil-coordinates data C $(x_3, y_3)$. Then the average-coordinates point corresponding to the pupil-coordinates calibration data group with three pupil-coordinates data is $$\left(\frac{x_1 + x_2 + x_3}{3}, \frac{y_1 + y_2 + y_3}{3}\right).$$

The distance value from the pupil-coordinates data A to the average-coordinates point is $$\sqrt{\left(x_1 - \frac{x_1 + x_2 + x_3}{3}\right)^2 + \left(y_1 - \frac{y_1 + y_2 + y_3}{3}\right)^2}.$$

The distance value from the pupil-coordinates data B to the average-coordinates point is $$\sqrt{\left(x_2 - \frac{x_1 + x_2 + x_3}{3}\right)^2 + \left(y_2 - \frac{y_1 + y_2 + y_3}{3}\right)^2}.$$

and the distance value from the remaining pupil-coordinates data C to the average-coordinates point is $$\sqrt{\left(x_3 - \frac{x_1 + x_2 + x_3}{3}\right)^2 + \left(y_3 - \frac{y_1 + y_2 + y_3}{3}\right)^2}.$$

Finally, multiple distance values are sorted in descending order, and the pupil-coordinates data corresponding to the first N distance values are deleted, wherein N is a positive integer.

At step (203.4): according to the method described in steps (203.1) to (203.3), deletion is performed on multiple pupil-coordinates data corresponding to each calibration point sequentially, so as to obtain at least one pupil-coordinates calibration data corresponding to each calibration point.

At step 204: parameters of a preset gaze-point calculation model are calibrated according to coordinates data of each calibration point and the at least one pupil-coordinates calibration data corresponding to the calibration point.

In the embodiments of the present application, after the at least one pupil-coordinates calibration data corresponding to each calibration point is obtained by the eyeball tracking system, multiple parameters of the preset gaze-point calculation model can be calibrated according to the coordinates data corresponding to each calibration point and the at least one pupil-coordinates calibration data corresponding to the calibration point, thus a user-specific gaze-point calculation model can be obtained. A detailed description will be given below on how the parameters of the preset gaze-point calculation model are calibrated by the eyeball tracking system according to coordinates data of each calibration point and the at least one pupil-coordinates calibration data corresponding to the calibration point.

At step (204.1), a pupil-coordinates calibration average data corresponding to each calibration point is calculated according to at least one pupil-coordinates calibration data corresponding to the calibration point.

In the embodiment of the present application, after at least one pupil-coordinates calibration data corresponding to each calibration point is obtained by the eyeball tracking system, a pupil-coordinates calibration average data corresponding to each calibration point is calculated according to at least one pupil-coordinates calibration data corresponding to the calibration point.

For the embodiments of the present application, the specific application scenario may be given as follows without limitation.

The pupil-coordinates calibration data corresponding to calibration point 1 comprises pupil-coordinates calibration data $A(x_1^1, y_1^1)$, pupil-coordinates calibration data $B(x_1^2, y_1^2)$, ..., pupil-coordinates calibration data $N(x_1^n, y_1^n)$. Then the pupil-coordinates calibration average data corresponding to calibration point 1 is $(\overline{x_1}, \overline{y_1})$, where $$\overline{x_1} = \frac{x_1^1 + x_1^2 + \cdots + x_1^n}{n}, \overline{y_1} = \frac{y_1^1 + y_1^2 + \cdots + y_1^n}{n}.$$

Similarly, the calculated pupil-coordinates calibration average data corresponding to calibration point 2 is $(\overline{x_2}, \overline{y_2})$. The pupil-coordinates calibration average data corresponding to calibration point n is $(\overline{x_n}, \overline{y_n})$.

At step (204.2), the coordinates data of each calibration point and the pupil-coordinates calibration average data corresponding to the calibration point are substituted into a preset gaze-point calculation model to obtain multiple polynomials.

In the embodiments of the present application, the coordinates data of each calibration point and the pupil-coordinates calibration average data corresponding to the calibration point are substituted into a preset gaze-point calculation model to obtain multiple polynomials, after the pupil-coordinates calibration average data corresponding to each calibration point is calculated by the eyeball tracking system. The preset gaze-point calculation model is specifically given as follows.

$$X = a_1 \cdot x + a_2 \cdot y + a_3 \cdot x^2 + a_4 \cdot y^2 + a_5 \cdot x^2 \cdot y^2$$

$$Y = b_1 \cdot x + b_2 \cdot y + b_3 \cdot x^2 + b_4 \cdot y^2 + b_5 \cdot x^2 \cdot y^2$$

Among them, $a_1$, $a_2$, $a_3$, $a_4$, $a_5$, $b_1$, $b_2$, $b_3$, $b_4$ and $b_5$ are multiple parameters of the preset gaze-point calculation model.

For the embodiments of the present application, the specific application scenario may be given as follows without limitation.

After step (204.1), the pupil-coordinates calibration average data corresponding to the calibration point 1 is $(\overline{x_1}, \overline{y_1})$. The pupil-coordinates calibration average data corresponding to the calibration point 2 is $(\overline{x_2}, \overline{y_2})$. The pupil-coordinates calibration average data corresponding to the calibration point n is $(\overline{x_n}, \overline{y_n})$. The coordinate data corresponding to the calibration point 1 is $(X_1, Y_1)$. The coordinate data corresponding to the calibration point 2 is $(X_2, Y_2)$ .... The coordinate data corresponding to the calibration point n is $(X_n, Y_n)$. Thus, the coordinates data of each calibration point and the pupil-coordinates calibration average data corresponding to the calibration point are substituted into a preset gaze-point calculation model to obtain multiple polynomials. The multiple polynomials are given as follows.

$$X_1 = a_1 \cdot \overline{x_1} + a_2 \cdot \overline{y_1} + a_3 \cdot \overline{x_1^2} + a_4 \cdot \overline{y_1^2} + a_5 \cdot \overline{x_1^2} \cdot \overline{y_1^2} \quad 1.$$
$$Y_1 = b_1 \cdot \overline{x_1} + b_2 \cdot \overline{y_1} + b_3 \cdot \overline{x_1^2} + b_4 \cdot \overline{y_1^2} + b_5 \cdot \overline{x_1^2} \cdot \overline{y_1^2}$$

$$X_2 = a_1 \cdot \overline{x_2} + a_2 \cdot \overline{y_2} + a_3 \cdot \overline{x_2^2} + a_4 \cdot \overline{y_2^2} + a_5 \cdot \overline{x_2^2} \cdot \overline{y_2^2} \quad 2.$$
$$Y_2 = b_1 \cdot \overline{x_2} + b_2 \cdot \overline{y_2} + b_3 \cdot \overline{x_2^2} + b_4 \cdot \overline{y_2^2} + b_5 \cdot \overline{x_2^2} \cdot \overline{y_2^2}$$

...

$$X_n = a_1 \cdot \overline{x_n} + a_2 \cdot \overline{y_n} + a_3 \cdot \overline{x_n^2} + a_4 \cdot \overline{y_n^2} + a_5 \cdot \overline{x_n^2} \cdot \overline{y_n^2} \quad n.$$
$$Y_n = b_1 \cdot \overline{x_n} + b_2 \cdot \overline{y_n} + b_3 \cdot \overline{x_n^2} + b_4 \cdot \overline{y_n^2} + b_5 \cdot \overline{x_n^2} \cdot \overline{y_n^2}$$

At step (204.3), the multiple polynomials are solved by a least square method to calculate the parameters of the preset gaze-point calculation model.

In the embodiments of the present application, after the coordinates data of each calibration point and the pupil-coordinates calibration average data corresponding to the calibration point are substituted into the preset gaze-point calculation model and multiple polynomials are obtained by the eyeball tracking system, the multiple polynomials are solved by the least square method to calculate the multiple parameters of the gaze-point calculation model, so as to obtain the user-specific gaze-point calculation model. In the subsequent process of the user using the VR device or the AR device, the pupil-coordinates data of the user is input into the user-specific gaze-point calculation model by the eyeball tracking system, and the position coordinates of the user's gaze-point on the device screen can be accurately calculated.

In order to achieve the above object, according to another aspect of the present application, an electronic device is also provided by the embodiments of the present application. The electronic device comprises a memory, a processor and a program stored in the memory and executable on the processor, wherein when the processor executes the program, the method for calibrating parameters of a gaze-point calculation model described above is implemented.

In order to achieve the above object, according to another aspect of the present application, a method for calculating a gaze-point is also provided by the embodiments of the present application. The method comprises: collecting multiple pupil-coordinates data, calculating a gaze-point on a device screen according to a gaze-point calculation model and the multiple pupil-coordinates data; wherein calculating parameters in a gaze-point calculation model includes: displaying multiple calibration points in sequence on the device screen and collecting multiple pupil-coordinates data corresponding to at least one calibration point of the multiple calibration points; for each calibration point of the at least one calibration point: screening multiple pupil-coordinates data corresponding to the calibration point, to obtain at least one pupil-coordinates calibration data corresponding to the calibration point; calculating the parameters of the gaze-point calculation model, according to the coordinates data of each calibration point and the at least one pupil-coordinates calibration data corresponding to the calibration point.

After the user-specific gaze-point calculation model is obtained, in the subsequent process of the user using the VR device or the AR device, the pupil-coordinates data of the user is input into the user-specific gaze-point calculation model by the eyeball tracking system, and the position coordinates of the user's gaze-point on the device screen can be accurately calculated.

In order to achieve the above object, according to another aspect of the present application, the embodiments of the present application further provides a non-volatile computer-readable storage medium having stored thereon a computer program that, when executed by a computer, causes the computer to perform the method for calculating parameters of a gaze-point calculation model.

Figure 4:
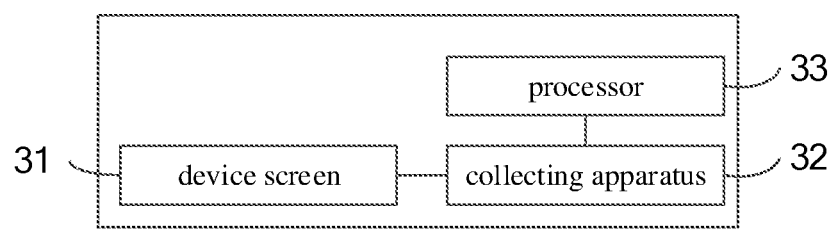
FIG. 4 is a block diagram of a device for calibrating parameters of a gaze-point calculation model according to the embodiments of the present application.

Further, as an implementation of the above-mentioned methods shown in FIG. 1 and FIG. 2, a device for calibrating parameters of a gaze-point calculation model is provided by the embodiments of the present application. The embodiments of the device correspond to the above embodiments for the method. For the convenience of reading, the embodiments of the device will not repeat the details in the above embodiments of the method, but it should be clear that the embodiments of the device can correspondingly realize all the contents in the above embodiments of the method. The device is applied to accurately calibrate multiple parameters in the gaze-point calculation model. Specifically, as shown in FIG. 4, the device comprises a device screen 31, a collecting apparatus 32 and a processor 33, wherein the device screen 31 is a display screen in a VR device or an AR device, the collecting apparatus 32 is an infrared camera in the VR device or the AR device, and the processor 33 is a processor in the VR device or the AR device. The device screen 31 is configured to sequentially display multiple calibration points. The collecting apparatus 32 is configured to collect multiple pupil-coordinates data corresponding to each of at least one calibration point of the multiple calibration points. The processor 33 is configured to, for each calibration point of the at least one calibration point, screen multiple pupil-coordinates data corresponding to the calibration point, to obtain at least one pupil-coordinates calibration data corresponding to the calibration point; calculate the parameters of the gaze-point calculation model, according to coordinates data of each calibration point and the at least one pupil-coordinates calibration data corresponding to the calibration point.

Further, the processor 33 is specifically configured to perform the following steps. The multiple pupil-coordinates data corresponding to the calibration point are divided and grouped, so as to obtain multiple pupil-coordinates data groups. A standard deviation value corresponding to each of the multiple pupil-coordinates data groups is calculated. And a pupil-coordinates data group with the smallest standard deviation value is determined as a pupil-coordinates calibration data group corresponding to the calibration point. Abnormal pupil-coordinates data is deleted from the pupil-coordinates calibration data group, and at least one pupil-coordinates data included in the pupil-coordinates calibration data group after deletion is determined as the pupil-coordinates calibration data corresponding to the calibration point.

Further, the processor 33 is specifically configured to perform the following steps. For each of the multiple pupil-coordinates data groups: an abscissa and an ordinate corresponding to each pupil-coordinates data of the pupil-coordinates data group is extracted; a first standard deviation value corresponding to multiple abscissas is calculated, and a second standard deviation value corresponding to multiple ordinates is calculated; an average value of the first standard deviation value and the second standard deviation value is calculated, and is determined as the standard deviation value corresponding to the pupil-coordinates data group.

Further, the processor 33 is specifically configured to perform the following steps. A first deletion operation is performed on the pupil-coordinates calibration data group so as to delete highly-abnormal pupil-coordinates data in the pupil-coordinates calibration data group. The first deletion operation specifically comprises the following steps. An abscissa and an ordinate corresponding to each pupil-coordinates data in the pupil-coordinates calibration data group are extracted. For each of the pupil-coordinates data in the pupil-coordinates calibration data group, a coordinates average value corresponding to the pupil-coordinates calibration data are calculated according to the abscissa and the ordinate corresponding to the pupil-coordinates data. An average value corresponding to the pupil-coordinates calibration data group is calculated based on multiple coordinates average values corresponding to multiple pupil-coordinates data in the pupil-coordinates calibration data group. After the average value and the standard deviation value corresponding to the pupil-coordinates calibration data group are obtained, a pupil-coordinates range is set according to the average value and the standard deviation value corresponding to the pupil-coordinates calibration data group. A pupil-coordinates data that does not satisfy the pupil-coordinates range is deleted as the highly-abnormal pupil-coordinates data.

In addition, a second deletion operation is performed on the pupil-coordinates calibration data group so as to delete lowly-abnormal pupil-coordinates data in the pupil-coordinates calibration data group. The second deletion operation specifically comprises the following steps. An average-coordinates point corresponding to the pupil-coordinates calibration data group is calculated according to the abscissa and the ordinate corresponding to each pupil-coordinates data in the pupil-coordinates calibration data group after deleting the highly-abnormal pupil-coordinates data. Distance values from each pupil-coordinates data to the average-coordinates point are calculated. Multiple distance values are sorted in descending order, and N pupil-coordinates data corresponding to the top-ranked N distance values are deleted, wherein N is a positive integer.

Further, the processor 33 is specifically configured to perform the following steps. A pupil-coordinates calibration average data corresponding to the calibration point is calculated according to at least one pupil-coordinates calibration data corresponding to the calibration point. The coordinates data of each calibration point and the pupil-coordinates calibration average data corresponding to the calibration point are substituted into a preset gaze-point calculation model to obtain multiple polynomials. The multiple polynomials are solved by a least square method to calculate the parameters of the preset gaze-point calculation model.

Further, the device screen 31 is specifically configured to sequentially display multiple calibration points on the device screen according to preset positions.

To sum up, the embodiments of the present application provides a method and a device for calibrating parameters of a gaze-point calculation model. Compared with the prior art, in which an eyeball tracking system just collects one pupil-coordinates data corresponding to each calibration point when calibrating multiple model parameters in a gaze-point calculation model, in the embodiments of the present application, multiple calibration points can be sequentially displayed in a device screen by an eyeball tracking system in a VR device or an AR device after a user wears the VR device or the AR device; in the process that the user looks at each calibration point displayed on the device screen, multiple pupil-coordinates data corresponding to each calibration point are collected by the eyeball tracking system, and deletion is performed on some of the multiple pupil-coordinates data corresponding to each calibration point, thus at least one pupil-coordinates calibration data corresponding to each calibration point is obtained; finally, multiple parameters of the preset gaze-point calculation model are calibrated according to the coordinates data of each calibration point and the at least one pupil-coordinates calibration data corresponding to the calibration point. Since multiple pupil-coordinates data corresponding to each calibration point are collected by the eyeball tracking system during the process of a user looking at each calibration point, and abnormal pupil-coordinates data are deleted among the multiple pupil-coordinates data corresponding to each calibration point to obtain pupil-coordinates calibration data corresponding to each calibration point, multiple parameters of the preset gaze-point calculation model can be accurately calibrated by the eyeball tracking system based on the pupil-coordinates calibration data corresponding to each calibration point. Therefore, it can be effectively avoided that multiple parameters obtained by calibration are inaccurate due to the user's blinking in the process of photographing user eye images and errors in the process of pupil-coordinates data calculation.

The embodiments of the present application provide an electronic device, which comprises a memory, a processor and a program stored on the memory and executable on the processor, wherein when the processor executes the program, the method for calibrating parameters of a gaze-point calculation model is implemented.

The embodiments of the present application provide a non-volatile computer-readable storage medium having a computer program stored thereon, and when the program is executed by a computer, the method for calibrating parameters of a gaze-point calculation model is implemented.

The embodiments of the present application provide a device, which comprises a processor, a memory and a program stored on the memory and executable on the processor. When the program is executed by the processor, the following steps are implemented. Multiple calibration points are displayed in sequence on a device screen, and multiple pupil-coordinates data corresponding to each of at least one calibration point of the multiple calibration points are collected. For each of the at least one calibration point: the multiple pupil-coordinates data corresponding to the calibration point are screened to obtain at least one pupil-coordinates calibration data corresponding to the calibration point. Then, the parameters of the gaze-point calculation model are calculated according to coordinates data of each calibration point and the at least one pupil-coordinates calibration data corresponding to the calibration point.

Further, the screening the multiple pupil-coordinates data corresponding to the calibration point comprises: dividing the multiple pupil-coordinates data corresponding to the calibration point into multiple pupil-coordinates data groups; calculating a standard deviation value corresponding to each of the pupil-coordinates data groups, and determining a pupil-coordinates data group with the smallest standard deviation value as a pupil-coordinates calibration data group corresponding to the calibration point; deleting abnormal pupil-coordinates data in the pupil-coordinates calibration data group, and determining at least one pupil-coordinates data included in the pupil-coordinates calibration data group after deletion as the pupil-coordinates calibration data corresponding to the calibration point.

Further, the calculating the standard deviation value corresponding to each of multiple pupil-coordinates data groups comprises: for each of the multiple pupil-coordinates data groups: extracting an abscissa and an ordinate corresponding to each pupil-coordinates data of the pupil-coordinates data group; calculating a first standard deviation value corresponding to multiple abscissas, and calculating a second standard deviation value corresponding to multiple ordinates; calculating an average value of the first standard deviation value and the second standard deviation value, and determining the average value as the standard deviation value corresponding to the pupil-coordinates data group.

Further, the deleting abnormal pupil-coordinates data in the pupil-coordinates calibration data group further comprises performing a first deletion operation on the pupil-coordinates calibration data group so as to delete highly-abnormal pupil-coordinates data in the pupil-coordinates calibration data group. The first deletion operation specifically comprises the following steps. An abscissa and an ordinate corresponding to each pupil-coordinates data are extracted in the pupil-coordinates calibration data group. For each of the pupil-coordinates data in the pupil-coordinates calibration data group, a coordinates average value corresponding to the pupil-coordinates calibration data is calculated according to the abscissa and the ordinate corresponding to the pupil-coordinates data. An average value corresponding to the pupil-coordinates calibration data group is calculated based on multiple coordinates average values corresponding to multiple pupil-coordinates data in the pupil-coordinates calibration data group. After the average value and the standard deviation value corresponding to multiple pupil-coordinates data in the pupil-coordinates calibration data group are obtained, a pupil-coordinates range is set according to the coordinates average value and the standard deviation value corresponding to the pupil-coordinates calibration data group. A pupil-coordinates data that does not satisfy the pupil-coordinates range is deleted as the highly-abnormal pupil-coordinates data.

In addition, a second deletion operation is performed on the pupil-coordinates calibration data group so as to delete lowly-abnormal pupil-coordinates data in the pupil-coordinates calibration data group. The second deletion operation specifically comprises the following steps. An average-coordinates point corresponding to the pupil-coordinates calibration data group is calculated according to the abscissa and the ordinate corresponding to each pupil-coordinates data in the pupil-coordinates calibration data group after the highly-abnormal pupil-coordinates data is deleted. Distance values from each pupil-coordinates data to the average-coordinates point are calculated. Multiple distance values are sorted in descending order, and N pupil-coordinates data corresponding to the top-ranked N distance values are deleted, wherein N is a positive integer.

Further, the calculating the parameters of the gaze-point calculation model according to coordinates data of each calibration point and the at least one pupil-coordinates calibration data corresponding to the calibration point comprises: calculating a pupil-coordinates calibration average data corresponding to each calibration point according to at least one pupil-coordinates calibration data corresponding to the calibration point; substituting the coordinates data of each calibration point and the pupil-coordinates calibration average data corresponding to the calibration point into a preset gaze-point calculation model to obtain multiple polynomials; solving the multiple polynomials by a least square method to calculate the parameters of the gaze-point calculation model.

Further, the displaying multiple calibration points in sequence on the device screen comprises: sequentially displaying multiple calibration points on the device screen according to preset positions. The devices in the present application may be VR devices, AR devices, etc.

The application also provides a computer program product with program codes. When being executed on a data processing device, the program codes are initialized with the following method steps. Multiple calibration points are displayed in sequence on a device screen, and multiple pupil-coordinates data corresponding to each of at least one calibration point of the multiple calibration points are collected. For each of the at least one calibration point: the multiple pupil-coordinates data corresponding to the calibration point are screened to obtain at least one pupil-coordinates calibration data corresponding to the calibration point. Then, the parameters of the gaze-point calculation model are calculated according to coordinates data of each calibration point and the at least one pupil-coordinates calibration data corresponding to the calibration point.

Those skilled in the art will understand that embodiments of the present application may be provided as methods, systems, or computer program products. Therefore, the present application may take the form of an entirely hardware embodiment, an entirely software embodiment, or an embodiment combining software and hardware aspects. Moreover, the present application may take the form of a computer program product implemented on one or more computer-usable storage media (including but not limited to a magnetic disk memory, CD-ROM, optical memory, etc.) having computer-usable program code embodied therein.

The present application is described with reference to flowcharts and/or block diagrams of methods, devices (systems), and computer program products according to embodiments of the present application. It should be understood that each flow and/or block in the flowchart and/or block diagram, and combinations of flows and/or blocks in the flowchart and/or block diagram, may be implemented by computer program instructions. These computer program instructions may be provided to a processor of a general purpose computer, special purpose computer, embedded processor, or other programmable data processing apparatus to produce a machine, such that the instructions executed by the processor of the computer or other programmable data processing device for implementing the functions specified in the flowchart flow or flows and/or block or blocks of the block diagram.

These computer program instructions may also be stored in a non-volatile computer-readable memory that can direct a computer or other programmable data processing apparatus to function in a particular manner, and the instructions implement the functions specified in the flowchart flow or flows and/or block or blocks of the block diagram.

These computer program instructions may also be loaded onto a computer or other programmable data processing device such that a series of operational steps are performed on the computer or other programmable device, such that the instructions that execute on the computer or other programmable apparatus provide steps for implementing the functions specified in the flowchart flow or flows and/or block or blocks of the block diagram.

In a typical configuration, a computing device includes one or more processors (CPU), input/output interfaces, network interfaces, and memory.

The memory may include non-permanent memory, random access memory (RAM) and/or non-volatile memory in a computer-readable medium, such as read-only memory (ROM) or flash memory (flash RAM). Memory is an example of a computer-readable medium.

Computer-readable media include permanent and non-permanent, removable and non-removable media. Information storage can be implemented by any method or technology. Information may be computer-readable instructions, data structures, modules or programs, or other data. Examples of storage media for computers include, without limitation, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disc (DVD) or other optical storage, magnetic cassettes, magnetic tape, magnetic disk storage or other magnetic storage devices or any other non-transmission medium that may be used to store information accessible by a computing device.

It should also be noted that the terms "comprising," "including," or any other variation thereof are intended to cover a non-exclusive inclusion, such that a process, method, article, or device that includes a list of elements includes not only those elements, but also other elements not expressly listed, or elements inherent to such process, method, article, or apparatus. Without further restrictions, the element defined by the statement "includes a/an . . . " does not exclude that there are other identical elements in the process, method, commodity or device that includes the element.

Those skilled in the art will appreciate that embodiments of the present application may be provided as methods, systems, or computer program products. Therefore, the present application may take the form of an entirely hardware embodiment, an entirely software embodiment, or an embodiment combining software and hardware aspects. Moreover, the present application may take the form of a computer program product implemented on one or more computer-usable storage media (including but not limited to a magnetic disk memory, CD-ROM, optical memory, etc.) having computer-usable program code embodied therein.

What described above is related to the illustrative embodiments of the disclosure only and not limitative to the scope of the disclosure; the scopes of the disclosure are defined by the accompanying claims.

What is claimed is:

1. A method for calculating parameters of a gaze-point calculation model, comprising:

displaying multiple calibration points in sequence on a device screen, and collecting multiple pupil-coordinates data corresponding to each of at least one calibration point of the multiple calibration points;

for each calibration point of the at least one calibration point, screening the multiple pupil-coordinates data corresponding to the calibration point, to obtain at least one pupil-coordinates calibration data corresponding to the calibration point;

calculating multiple parameters of the gaze-point calculation model according to coordinates data of each calibration point and the at least one pupil-coordinates calibration data corresponding to the calibration point, wherein the screening the multiple pupil-coordinates data corresponding to the calibration point further comprises:

dividing the multiple pupil-coordinates data corresponding to the calibration point into multiple pupil-coordinates data groups;

for each of the multiple pupil-coordinates data groups, calculating a standard deviation value corresponding to the pupil-coordinates data group;

determining a pupil-coordinates data group with the smallest standard deviation value as a pupil-coordinates calibration data group corresponding to the calibration point;

deleting abnormal pupil-coordinates data in the pupil-coordinates calibration data group, and determining at least one pupil-coordinates data included in the pupil-coordinates calibration data group after deletion as the pupil-coordinates calibration data corresponding to the calibration point.

2. The method of claim 1, wherein the calculating the standard deviation value corresponding to the pupil-coordinates data group comprises:

extracting an abscissa and an ordinate corresponding to each pupil-coordinates data of the pupil-coordinates data group;

calculating a first standard deviation value corresponding to multiple abscissas of the pupil-coordinates data group, and calculating a second standard deviation value corresponding to multiple ordinates of the pupil-coordinates data group;

calculating an average value of the first standard deviation value and the second standard deviation value, and determining the average value as the standard deviation value corresponding to the pupil-coordinates data group.

3. The method of claim 1, wherein the deleting abnormal pupil-coordinates data in the pupil-coordinates calibration data group further comprises:

deleting highly-abnormal pupil-coordinates data in the pupil-coordinates calibration data group, and deleting lowly-abnormal pupil-coordinates data in the pupil-coordinates calibration data group.

4. The method of claim 3, wherein the deleting highly-abnormal pupil-coordinates data in the pupil-coordinates calibration data group further comprises:

extracting an abscissa and an ordinate corresponding to each pupil-coordinates data in the pupil-coordinates calibration data group;

calculating a coordinates average value corresponding to the pupil-coordinates calibration data group, according to the abscissa and the ordinate corresponding to each pupil-coordinates data;

setting a pupil-coordinates range, according to the coordinates average value and the standard deviation value corresponding to the pupil-coordinates calibration data group; and deleting pupil-coordinates data that does not satisfy the pupil-coordinates range, as the highly-abnormal pupil-coordinates data.

5. The method of claim 4, wherein the deleting lowly-abnormal pupil-coordinates data in the pupil-coordinates calibration data group further comprises:

calculating an average-coordinates point corresponding to the pupil-coordinates calibration data group, according to the abscissa and the ordinate corresponding to each pupil-coordinates data in the pupil-coordinates calibration data group after the highly-abnormal pupil-coordinates data is deleted;

calculating distance values from each pupil-coordinates data to the average-coordinates point;

sorting multiple distance values in descending order; and deleting a predetermined count of pupil-coordinates data corresponding to the top-ranked distance values in the pupil-coordinates calibration data group.

6. The method of claim 1, wherein the calculating multiple parameters of the gaze-point calculation model according to coordinates data of each calibration point and the at least one pupil-coordinates calibration data corresponding to the calibration point comprises:

for each of the at least one calibration point, calculating pupil-coordinates calibration average data corresponding to the calibration point, according to at least one pupil-coordinates calibration data corresponding to the calibration point;

substituting the coordinates data of each calibration point and the pupil-coordinates calibration average data corresponding to the calibration point into the gaze-point calculation model to obtain multiple polynomials;

solving the multiple polynomials by a least square method to calculate the multiple parameters of the gaze-point calculation model.

7. The method of claim 1, wherein the displaying multiple calibration points in sequence on the device screen comprises:

sequentially displaying multiple calibration points on the device screen according to preset positions.

8. The method of claim 7, wherein the preset positions are arranged in a matrix or a ring.

9. A method for calculating gaze-points, comprising:

collecting multiple pupil-coordinates data, calculating a gaze-point on a device screen, according to a gaze-point calculation model and the multiple pupil-coordinates data;

wherein parameters of the gaze-point calculation model are calculated by the following steps:

displaying multiple calibration points in sequence on the device screen, and collecting multiple pupil-coordinates data corresponding to each of at least one calibration point of the multiple calibration points;

for each calibration point of the at least one calibration point, screening the multiple pupil-coordinates data corresponding to the calibration point, to obtain at least one pupil-coordinates calibration data corresponding to the calibration point;

calculating multiple parameters of the gaze-point calculation model, according to coordinates data of each calibration point and the at least one pupil-coordinates calibration data corresponding to the calibration point, wherein the screening the multiple pupil-coordinates data corresponding to the calibration point further comprises:

dividing the multiple pupil-coordinates data corresponding to the calibration point into multiple pupil-coordinates data groups;

for each of the multiple pupil-coordinates data groups, calculating a standard deviation value corresponding to the pupil-coordinates data group;

determining a pupil-coordinates data group with the smallest standard deviation value as a pupil-coordinates calibration data group corresponding to the calibration point;

deleting abnormal pupil-coordinates data in the pupil-coordinates calibration data group, and determining at least one pupil-coordinates data included in the pupil-coordinates calibration data group after deletion as the pupil-coordinates calibration data corresponding to the calibration point.

10. The method of claim 9, wherein the calculating the standard deviation value corresponding to the pupil-coordinates data group comprises:

extracting an abscissa and an ordinate corresponding to each pupil-coordinates data of the pupil-coordinates data group;

calculating a first standard deviation value corresponding to multiple abscissas of the pupil-coordinates data group, and calculating a second standard deviation value corresponding to multiple ordinates of the pupil-coordinates data group;

calculating an average value of the first standard deviation value and the second standard deviation value, and determining the average value as the standard deviation value corresponding to the pupil-coordinates data group.

11. The method of claim 9, wherein the deleting abnormal pupil-coordinates data in the pupil-coordinates calibration data group further comprises:

deleting highly-abnormal pupil-coordinates data in the pupil-coordinates calibration data group, and deleting lowly-abnormal pupil-coordinates data in the pupil-coordinates calibration data group.

12. The method of claim 9, wherein the calculating multiple parameters of the gaze-point calculation model according to coordinates data of each calibration point and the at least one pupil-coordinates calibration data corresponding to the calibration point comprises:

for each of the at least one calibration point, calculating pupil-coordinates calibration average data corresponding to the calibration point, according to at least one pupil-coordinates calibration data corresponding to the calibration point;

substituting the coordinates data of each calibration point and the pupil-coordinates calibration average data corresponding to the calibration point into the gaze-point calculation model to obtain multiple polynomials;

solving the multiple polynomials by a least square method to calculate the multiple parameters of the gaze-point calculation model.

13. The method of claim 9, wherein the displaying multiple calibration points in sequence on the device screen comprises:

sequentially displaying multiple calibration points on the device screen according to preset positions.

14. A device for calculating parameters of a gaze-point calculation model, comprising: a display screen, a collecting apparatus, and a processor;

the display device, configured to sequentially display multiple calibration points;

the collecting apparatus, configured to collect multiple pupil-coordinates data corresponding to each of at least one calibration point of the multiple calibration points;

the processor, configured for:

for each calibration point of the at least one calibration point, screening the multiple pupil-coordinates data corresponding to the calibration point, to obtain at least one pupil-coordinates calibration data corresponding to the calibration point;

calculating multiple parameters of the gaze-point calculation model, according to coordinates data of each calibration point and the at least one pupil-coordinates calibration data corresponding to the calibration point, wherein the screening the multiple pupil-coordinates data corresponding to the calibration point further comprises:

dividing the multiple pupil-coordinates data corresponding to the calibration point into multiple pupil-coordinates data groups;

for each of the multiple pupil-coordinates data groups, calculating a standard deviation value corresponding to the pupil-coordinates data group;

determining a pupil-coordinates data group with the smallest standard deviation value as a pupil-coordinates calibration data group corresponding to the calibration point;

deleting abnormal pupil-coordinates data in the pupil-coordinates calibration data group, and determining at least one pupil-coordinates data included in the pupil-coordinates calibration data group after deletion as the pupil-coordinates calibration data corresponding to the calibration point.

15. The device of claim 14, wherein the calculating the standard deviation value corresponding to the pupil-coordinates data group comprises:

extracting an abscissa and an ordinate corresponding to each pupil-coordinates data of the pupil-coordinates data group;

calculating a first standard deviation value corresponding to multiple abscissas of the pupil-coordinates data group, and calculating a second standard deviation value corresponding to multiple ordinates of the pupil-coordinates data group;

calculating an average value of the first standard deviation value and the second standard deviation value, and determining the average value as the standard deviation value corresponding to the pupil-coordinates data group.

16. The device of claim 14, wherein the deleting abnormal pupil-coordinates data in the pupil-coordinates calibration data group further comprises:

deleting highly-abnormal pupil-coordinates data in the pupil-coordinates calibration data group, and deleting lowly-abnormal pupil-coordinates data in the pupil-coordinates calibration data group.

17. The device of claim 15, wherein the deleting highly-abnormal pupil-coordinates data in the pupil-coordinates calibration data group further comprises:

extracting an abscissa and an ordinate corresponding to each pupil-coordinates data in the pupil-coordinates calibration data group;

calculating a coordinates average value corresponding to the pupil-coordinates calibration data group, according to the abscissa and the ordinate corresponding to each pupil-coordinates data;

setting a pupil-coordinates range, according to the coordinates average value and the standard deviation value corresponding to the pupil-coordinates calibration data group; and deleting a pupil-coordinates data that does not satisfy the pupil-coordinates range, as the highly-abnormal pupil-coordinates data;

wherein the deleting lowly-abnormal pupil-coordinates data in the pupil-coordinates calibration data group further comprises:

calculating an average-coordinates point corresponding to the pupil-coordinates calibration data group, according to the abscissa and the ordinate corresponding to each pupil-coordinates data in the pupil-coordinates calibration data group after the highly-abnormal pupil-coordinates data is deleted;

calculating distance values from each pupil-coordinates data to the average-coordinates point;

sorting multiple distance values in descending order;

deleting a predetermined count of pupil-coordinates data corresponding to the top-ranked distance values in the pupil-coordinates calibration data group.

* * * * *